(12) United States Patent
Yoshimura et al.

(10) Patent No.: US 8,834,217 B2
(45) Date of Patent: Sep. 16, 2014

(54) DOG CLUTCH MECHANISM FOR OUTBOARD MOTOR

(75) Inventors: Hajime Yoshimura, Wako (JP); Ryo Ogasawara, Wako (JP); Nobuchika Katagiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 12/754,945

(22) Filed: Jul. 26, 2010

(65) Prior Publication Data

US 2010/0282563 A1    Nov. 11, 2010

(51) Int. Cl.
| | |
|---|---|
| B63H 20/20 | (2006.01) |
| B63H 23/30 | (2006.01) |
| F16D 11/10 | (2006.01) |
| F16D 11/14 | (2006.01) |
| F16D 11/00 | (2006.01) |

(52) U.S. Cl.
CPC .............. B63H 20/20 (2013.01); B63H 23/30 (2013.01); *F16D 2011/008* (2013.01); *F16D 11/14* (2013.01)
USPC ......... 440/75; 192/69.82; 192/48.91; 192/51; 192/108; 192/114 T

(58) Field of Classification Search
CPC ... F16D 11/14; F16D 2011/008; F16D 11/10; B63H 23/30; B63H 20/20
USPC ............ 192/69.8, 69.82, 69.83, 69.81, 114 T, 192/108, 48.91, 51; 440/75, 86
See application file for complete search history.

(56) References Cited

U.S. PATENT DOCUMENTS

| | | | | |
|---|---|---|---|---|
| 1,597,198 A | * | 8/1926 | Howell | 192/69.81 |
| 1,746,764 A | * | 2/1930 | Carhart | 192/53.5 |
| 2,049,127 A | * | 7/1936 | Maybach | 192/69.8 |
| 2,969,134 A | * | 1/1961 | Wiedmann et al. | 192/84.92 |
| 3,224,535 A | * | 12/1965 | Herbkersman | 192/69.81 |
| 3,967,771 A | * | 7/1976 | Smith | 227/10 |

(Continued)

FOREIGN PATENT DOCUMENTS

| | | |
|---|---|---|
| JP | 5217706 | 2/1977 |
| JP | 04-63824 | 5/1992 |
| JP | 11-037173 | 2/1999 |
| JP | 2005-048820 A | 2/2005 |

OTHER PUBLICATIONS

Japanese Office Action, Patent Application No. P2009-093366, Notification of Reasons for Refusal, issued Nov. 20, 2012.

(Continued)

*Primary Examiner* — Gene Crawford
*Assistant Examiner* — Terry Chau
(74) *Attorney, Agent, or Firm* — Arent Fox LLP

(57) ABSTRACT

A dog clutch mechanism incorporated in an outboard motor includes a sliding clutch dog member splined to a propeller shaft and having recesses on each end face thereof, and a row of gear teeth formed on an end face of each of a pair of driven gears rotatably mounted on the propeller shaft. Each of the recesses has a bottom surface stepped to provide a corner edge at a stepped portion thereof. Each of the gear teeth has a beveled surface formed at a rear edge as viewed from a rotating direction of the driven gear. When the gear teeth are in mesh with the recesses of the clutch dog member, the corner edge of the stepped bottom surface of each recess is in contact with the beveled surface of the mating gear tooth.

2 Claims, 6 Drawing Sheets

(56) References Cited

U.S. PATENT DOCUMENTS

| | | | |
|---|---|---|---|
| 5,172,573 A * | 12/1992 | Sharp et al. | 68/23.7 |
| 6,044,951 A * | 4/2000 | Gutmann et al. | 192/108 |
| 6,893,305 B2 | 5/2005 | Natsume et al. | |
| 7,140,932 B2 * | 11/2006 | Mizuguchi et al. | 440/75 |
| 7,297,036 B1 * | 11/2007 | Weronke et al. | 440/75 |
| 8,002,097 B2 * | 8/2011 | Tsurumi | 192/48.91 |

OTHER PUBLICATIONS

Japanese Decision of Refusal with partial English translation, Patent Application No. P2009-093366, dated Apr. 16, 2013, 4 pages.

* cited by examiner

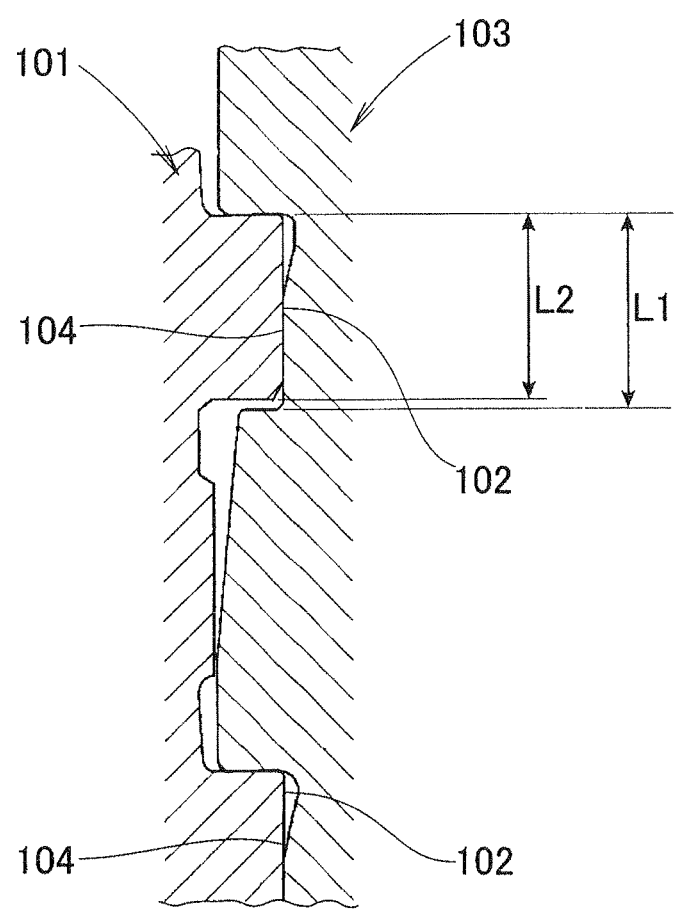

US 8,834,217 B2

DOG CLUTCH MECHANISM FOR OUTBOARD MOTOR

CROSS-REFERENCE TO RELATED APPLICATIONS

This application is based upon and claims the benefit of priority from Japanese Patent Application No. 2009-093366, filed on Apr. 7, 2009, the entire contents of which are incorporated herein by reference.

FIELD OF THE INVENTION

The present invention relates to an improvement in a dog clutch mechanism for outboard motors having a sliding clutch dog splined to the propeller shaft, with recesses cut into each end face for engaging the adjacent gears.

BACKGROUND OF THE INVENTION

A typical example of the dog clutch mechanisms of the type concerned is disclosed in Japanese Patent Laid-open Publication (JP-A) No. 2005-48820, which corresponds to U.S. Pat. No. 6,893,305 patented on May 17, 2005. As shown in FIG. 7 hereof, the disclosed dog clutch mechanism includes a forward gear 101 rotatably mounted on a propeller shaft, not shown, the forward gear 101 having teeth 102 on a surface that opposes one end face of a clutch dog member 103. The clutch dog member 103 is slidably mounted on the non-illustrated propeller shaft and has recesses 104 cut into the end face for meshing engagement with the teeth 102 of the forward gear 101. The forward gear 101 is continuously driven when an engine, not shown, is running. With this arrangement, when the clutch dog member 103 is axially displaced in a direction to move the recesses 104 into meshing engagement with the teeth 102 of the forward gear 101, power from the engine is transmitted from the forward gear 101 to the clutch dog member 103, causing the propeller shaft to rotate together with the clutch dog member 103.

In the known dog clutch mechanism, the circumferential length L1 of each of the recesses 104 of the clutch dog member 103 and the circumferential length L2 of each of the teeth 102 of the forward gear 101 are set to be substantially equal to each other so that a clearance formed between each recess 104 and a mating one of the teeth 102 during engagement between the clutch dog member 103 and the forward gear 101 is made as small as possible. The thus formed circumferential clearance is small, but the presence of the circumferential clearance still allows the teeth 102 and the recesses 104 to strike together and hence generate striking noise when the clutch dog member 103 and the forward gear 101 are subjected to torsional vibrations produced when the engine undergoes irregular combustion. Furthermore, the teeth 102 and the recesses 104 require high dimensional accuracies in terms of the dimensions in the circumferential direction, which will increase production cost the dog clutch mechanism.

It is accordingly an object of the present invention to provide a dog clutch mechanism for outboard motors, which can operate silently without involving generation of striking noise and can be manufactured at a relatively low cost.

SUMMARY OF THE INVENTION

According to the present invention, there is provided a dog clutch mechanism for transmitting power from a driving source to a propeller shaft of an outboard motor, comprising a forward gear and a reverse gear that are rotatably mounted on the propeller shaft in opposed relation to one another and driven by the driving source to rotate concurrently in opposite directions relative to each other, and a hollow cylindrical clutch dog member slidably disposed on the propeller shaft between the forward and reverse gears, the clutch dog member being rotatable with the propeller shaft. The forward and reverse gears each have a plurality of teeth on a surface that opposes the clutch dog member, and each of the teeth has a beveled surface at a rear side edge thereof as viewed from a rotating direction of each gear. The clutch dog member has a plurality of recesses on each end surface thereof that opposes the forward or reverse gear, the recesses being receptive of respective ones of the teeth of each of the forward and reverse gears when the clutch dog member engages with the forward or reverse gear. Each of the recesses has a bottom surface stepped to provide a corner edge at a stepped portion thereof. The corner edge is configured such that the corner edge is in contact with the beveled surface when the recesses of the clutch dog member engage with the teeth of the forward or reverse gear.

With this arrangement, when the recesses of the clutch dog member and the teeth of the forward or reverse gear are engaged together, the corner edges of the recesses are in contact with the beveled surfaces of the teeth so that there is zero clearance. In this instance because there is no clearance formed between the corner edges of the recesses and the beveled surfaces of the teeth as viewed in the rotating direction of the forward or reverse gear, the dog clutch mechanism can operate silently without generating unpleasant striking noise while the forward or reverse gear and the clutch dog member are rotating in an engaged state. The beveled surfaces of the teeth which are used in combination with the corner edges of the recesses allow for large dimensional tolerances for the recesses and the teeth, which will lead to cost reduction of the dog clutch mechanism.

In one preferred form of the invention, the corner edge is a sharp corner edge. The corner edge may be formed into a beveled corner edge in which instance the beveled corner edges reduce a surface pressure between themselves and the beveled surfaces of the teeth and thus reduce abrasive wear of the stepped bottom surfaces of the recesses and the beveled surfaces of the teeth.

Preferably, the teeth have a front surface facing in a forward direction as viewed from a rotating direction of an associated one of the forward and reverse gears, the front surface tilting forwardly at a predetermined angle with respect to an imaginary plane normal to a radial plane of the associated gear, and the recesses have a front surface engageable in face to face with the front surface of each of the teeth, the front surface of each recess tilting backwards, as viewed from the rotating direction of the forward or reverse gears, at the same angle as the predetermined angle with respect to an imaginary plane perpendicular to a radial plane of the clutch dog member. By thus tilting the front surface of each recess and the front surface of each tooth, it is possible to produce a component force acting in a direction to keep the corner edge of the recess into continuous contacting engagement with the beveled surface of the mating tooth during meshing engagement between the recess and the tooth. By the action of the component force, the clutch dog member and the forward or reverse gear are engaged together without clearance formed between the recesses and the teeth as viewed from the rotating direction of the forward or reverse gear even when the recesses and the teeth are subjected to torsional vibrations produced when the engine undergoes irregular combustion.

BRIEF DESCRIPTION OF THE DRAWINGS

A preferred structural embodiment of the present invention will be described in detail herein below, by way of example only, with reference to the accompanying sheets of drawings, in which:

FIGS. 4A through 4C are schematic cross-sectional views illustrating how the clutch dog member and the forward gear engage with each other, wherein FIG. 4A shows an initial state in which the clutch dog member is in a neutral position where it is disengaged from the forward gear, FIG. 4B shows an intermediate state in which the clutch clog member starts engaging with the forward gear, and FIG. 4C shows a last state in which the engagement between the clutch dog member and the forward gear is completed;

FIG. 7 is a cross-sectional view showing the last state of engagement between a clutch dog member and a forward gear of a conventional dog clutch mechanism.

DETAILED DESCRIPTION OF THE PREFERRED EMBODIMENT

Figure 1:
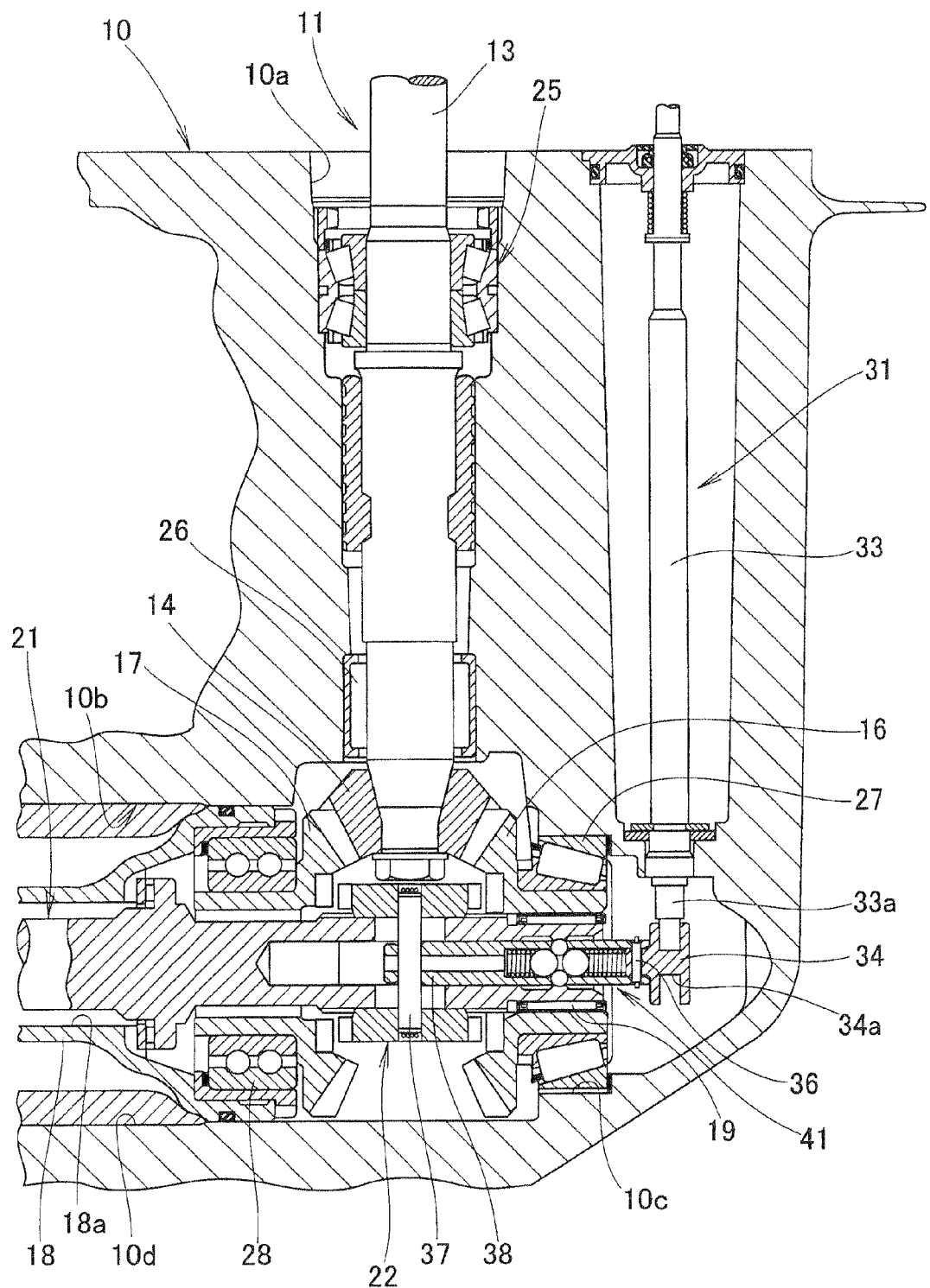
FIG. 1 is a vertical cross-sectional view of a portion of an outboard motor in which a dog clutch mechanism according to an embodiment of the present invention is incorporated.

Referring now to the drawings and FIG. 1 in particular, there is shown a gear case 10 which constitutes a lower part of an outboard motor. The gear case 10 includes a power transmission mechanism 11 for transmitting power from an engine (not shown) disposed at an upper part of the outboard motor to a screw propeller (not shown) disposed at a rear end of the lower part of the outboard motor.

The power transmission mechanism 11 includes a drive shaft 13 extending vertically downwardly inside the gear case 10 and rotatably mounted in the gear case 10, a driving bevel gear 14 fixedly mounted to a lower end of the drive shaft 13, a pair of driven bevel gears 16 and 17 meshing with the driving bevel gear 14, a propeller shaft 21 disposed horizontally and rotatably supported by the forward driven bevel gear 16 and a propeller shaft holder 18 disposed horizontally inside the gear case 10, and a clutch dog member 22 disposed between the forward and reverse driven bevel gears 16 and 17 and spline-coupled with the propeller shaft 21 for undergoing sliding movement in the axial direction of the propeller shaft 21.

The drive shaft 13 is rotatably supported by a double-row taper roller bearing 25 and a needle bearing 26 disposed in a vertical hole 10a formed in the gear case 10. The forward driven bevel gear (forward gear) 16 is rotatably supported by a taper roller bearing 27 disposed in a horizontal hole 10b (and more particularly in a front portion 10c of the horizontal hole 10b) formed in the gear case 10.

The reverse driven bevel gear (reverse gear) 17 is rotatably supported by a double-row angular ball bearing 28 disposed in a front end portion (right end portion in FIG. 1) of the propeller shaft holder 18 fitted in the horizontal hole 10b (and more particularly in a rear portion 10d of the horizontal hole 10b).

The propeller shaft holder 18 has a hollow cylindrical portion 18a, and a front end portion of the propeller shaft 21 is rotatably supported by a needle bearing (not shown) disposed in the hollow cylindrical portion 18a of the propeller shaft holder 18.

The propeller shaft 21 is rotatably mounted in the gear case 10 via the non-illustrated needle bearing disposed in the hollow cylindrical portion 18a of the propeller shaft holder 18 and a needle bearing 19 disposed on an inner peripheral surface of the forward driven bevel gear 16.

A shift mechanism 31 is associated with the front end portion of the propeller shaft 21 for switching operation of the outboard motor between a forward movement, a reverse movement and a stop, which correspond respectively to a forward rotation, a reverse rotation and a stop of the screw propeller. The shift mechanism 31 has a shift rod 33 extending vertically in the gear case 10 and rotatably mounted to the gear case 10, a shift piece 34 connected to a lower end portion of the shift rod 33, a shift slider 38 slidably inserted in the front end portion of the propeller shaft 21 with a front end thereof (right end in FIG. 1) connected by a front connecting pin 36 to the shift piece 34 and with a rear end thereof (left end in FIG. 1) connected by a rear connecting pin 37 to the clutch dog member 22, and a detent mechanism 41 for holding the shift slider 38 and the clutch dog member 22 in a selected shift position.

Although not shown in the drawings, the shift rod 33 is connected to a handle or other suitable means for allowing a human operator to operate the shift rod 33. The shift rod 33 has a lower end provided with an off-centered pin member 33a extending downwardly to fit in a circumferential groove 34a of the shift piece 34, so that rotational movements of the shift rod 33 around its longitudinal axis are converted into horizontal axial movements of the shift slider 38. The axial movements of the shift slider 38 lead to axial movements of the clutch dog member 22 on the propeller shaft 21. Thus, by operating the shift rod 33, the operator can selectively cause the clutch dog member 22 to engage one, the other, or neither of the driven bevel gears 16 and 17 to thereby select a desired shift position.

Figure 2:
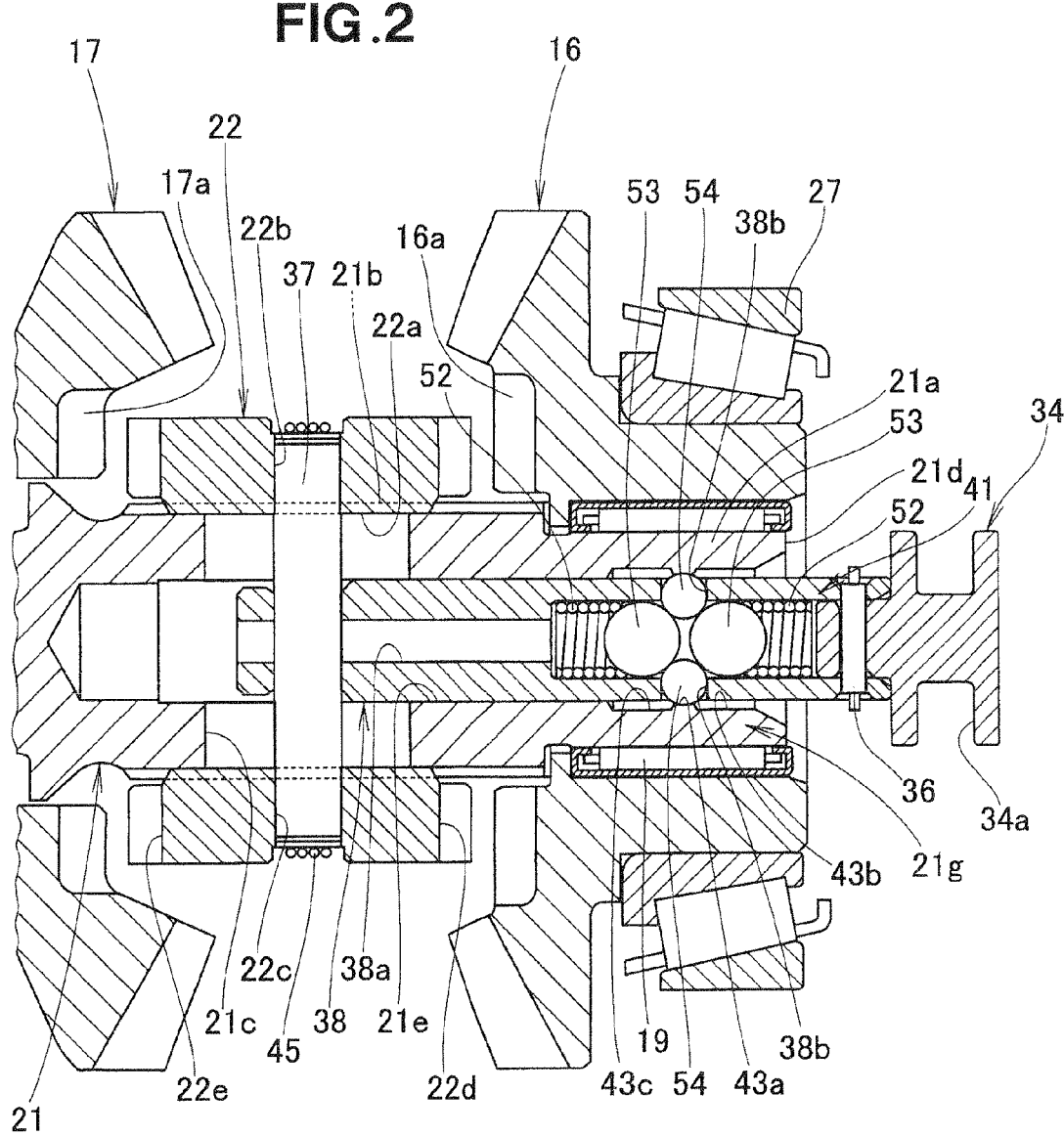
FIG. 2 is an enlarged cross-sectional view showing a general configuration of the dog clutch mechanism.

As shown in FIG. 2, the forward driven bevel gear 16 has a plurality of teeth 16a formed on an end face thereof that opposes an axial end face of the clutch dog member 22, and the reverse driven bevel gear 17 has a plurality of teeth 17a formed on an end face thereof that opposes another axial end face of the clutch dog member 22. The teeth 16a and the teeth 17a are arranged at regular intervals in the circumferential direction of the respective driven bevel gears 16, 17.

The front end portion of the propeller shaft 21 has a small-diameter portion 21a, a male-spline portion (splined shaft portion) 21b contiguous to a rear end of the small-diameter portion 21a and having an outside diameter larger than that of the small-diameter portion 21a, an oblong hole 21c extending diagrammatically across the male-spline portion 21b and having a major axis parallel to the central axis of the propeller shaft 21, and a slider insertion hole 21e extending inwardly from an end face 21d of the propeller shaft 21 along the central axis of the propeller shaft 21 for slidably receiving therein the shift slider 38. The slider insertion hole 21e has an outer end portion where a ball retainer portion 21g is formed.

The clutch dog member 22 has a female-spline (splined hole) 22 coupled with the male-spline portion (splined shaft portion) 21b of the propeller shaft 21, a pair of aligned radial through-holes 22b and 22c for receiving therein longitudinal portions of the rear connecting pin 37, a plurality of recesses 22d formed on one end face thereof for meshing engagement with the teeth 16a of the forward driven bevel gear 16, and a plurality of recesses 22e formed on the other end face thereof for meshing engagement with the teeth 17a of the reverse driven bevel gear 17. The recesses 22d and the recesses 22e are arranged at substantially the same intervals as the meting ones 16a, 17a of the teeth as viewed from the circumferential direction of the clutch dog member 22.

The rear connecting pin 37, as it is inserted into the radial through-holes 22b and 22c, extends longitudinally through the oblong hole 21c diametrically across the shift slider 38. Reference numeral 45 denotes a retaining ring which prevents the rear connecting pin 37 from displacing off the radial through-holes 22b, 22c of the clutch dog member 22.

The detent mechanism 41 includes a pair of compression coil springs 52, 52 disposed in an axial central hole 38a of the shift slider 38 with one end (an outer end) of each compression coil spring 52 positioned within the central hole 38a, a pair of first balls 53, 53 disposed in the axial central hole 38a of the shaft slider and held in contact with inner ends of the respective compression coil springs 52, 52, a pair of second balls 54, 54 movably disposed in a pair of diametrically opposite radial through-holes 38b, 38b, respectively, of the shift slider 38 and urged via the first balls 53 in a radial outward direction by the resiliency of the compression coil springs 52, and the ball retainer portion 21g formed on an inner peripheral surface of the slider insertion hole 21e of the propeller shaft 21 for holding or retaining the second balls 54 in a selected one of three desired positions, as will be described later.

The ball retainer portion 21g has a central annular ridge 43a having a concaved top end, a front annular recess 43b disposed on one axial side of the central ridge 43a, and a rear annular recess 43b disposed on the other axial side of the central ridge 43a. In a condition shown in FIG. 2, the second balls 54, 54 are retained in the concaved top end of the central ridge 43a of the ball retainer portion 21g under the resiliency of the compression springs 52, 52 acting on the second balls 54 via the first balls 53.

Figure 3:
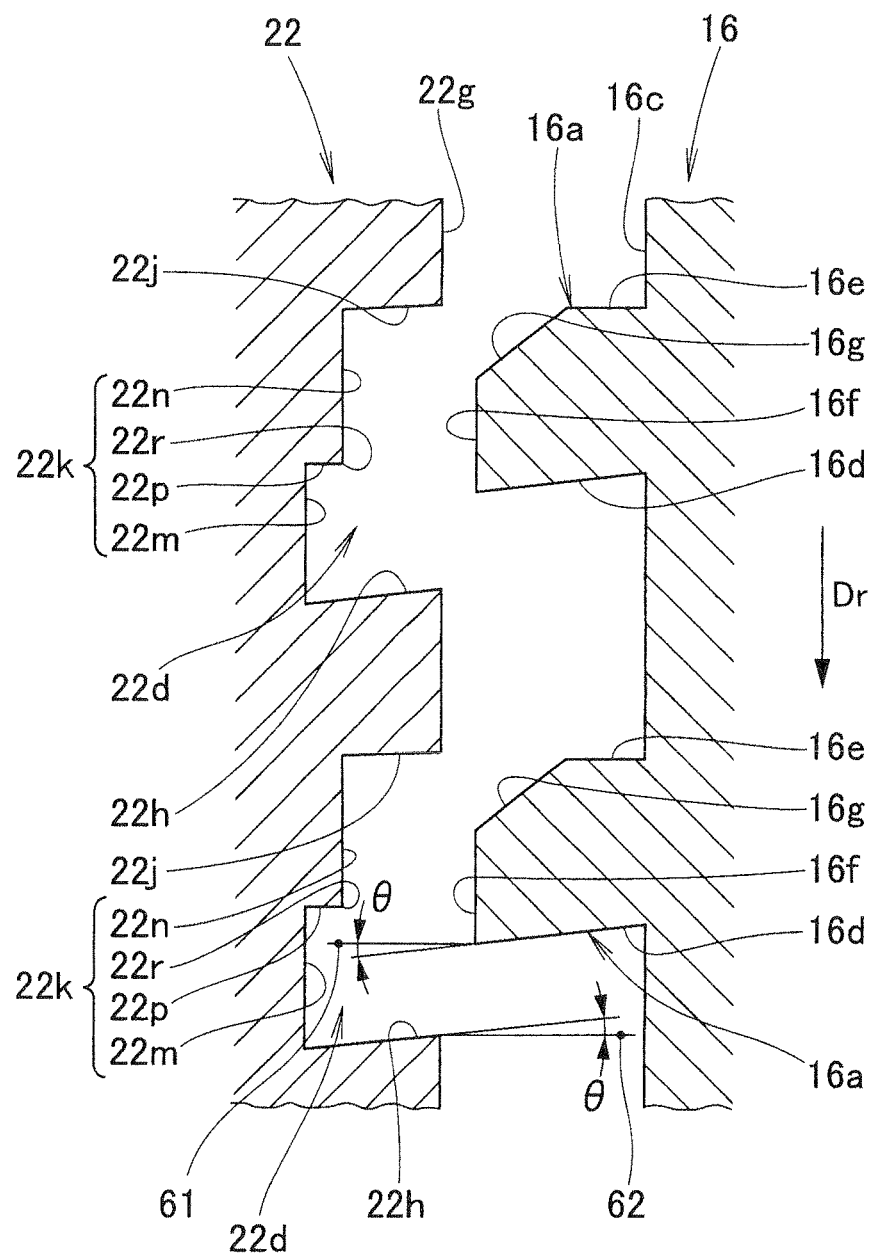
FIG. 3 is a cross-sectional view showing a shape and configuration of recesses of a clutch dog member and mating teeth of a forward gear of the dog clutch mechanism.

FIG. 3 shows in cross section the teeth 16a of the forward driven bevel gear 16 and the recesses 22d of the clutch dog member 22 that are developed in a circumferential direction. An arrow Dr shown in FIG. 3 indicates a rotating direction of the forward driven bevel gear 16.

As shown in FIG. 3, the teeth 16a of the forward driven bevel gear 16 protrude from a base surface 16c. Each of the teeth 16a has a front surface 16d facing in a forward direction as viewed from the rotating direction Dr of the forward driven bevel gear 16, a rear surface 16e facing in a backward direction as viewed from the rotating direction Dr of the forward driven bevel gear 16, a top surface 16f extending between upper ends of the front and rear surfaces 16d and 16e, and a beveled surface 16g formed at a corner between the top surface 16f and the rear surface 16e, the corner being a rear edge of the tooth as viewed from the rotating direction Dr of the forward driven bevel gear 16.

The recesses 22d of the clutch dog member 22 are cut into a base surface (end face) 22g of the clutch dog member 22. Each of the recesses 22d has opposing inner surfaces 22h and 22j and a bottom surface 22k extending between the inner surfaces 22h and 22j. The inner surface 22h is located forwardly of the inner surface 22j as viewed from the rotating direction Dr of the forward driven bevel gear 16. For purposes of illustration, the inner surface 22h and the inner surface 22j will be hereinafter referred to as "front surface" and "rear surface", respectively.

The bottom surface 22k of each recess 22d is stepped to provide a corner edge 22r formed at a stepped portion thereof. The stepped bottom surface 22k has a lower section 22m located adjacent to the front surface 22h, and a higher section 22n located adjacent to the rear surface 22j and connected to the lower section 22m by a boundary surface 22p extending perpendicularly to the lower and upper sections 22m and 22n. With the bottom surface 22k thus stepped, the recess 22d is deeper at the lower bottom surface section 22m than at the higher bottom surface section 22n. The corner edge 22r is a sharp corner edge.

The teeth 16a and the recesses 22d are configured such that when the clutch dog member 22 and the forward driven bevel gear 16 engage with each other with the front surfaces 22h of the respective recesses 22d held in abutment with the front surfaces 16d of the mating ones of the teeth 16a, the corner edges 22r of the stepped bottom surfaces 22k of the recesses 22d are in contact with the beveled surfaces 16g of the teeth 16a.

As shown in FIG. 3, the front surface 16d of each tooth 16a of the forward driven bevel gear 16 tilts forwardly, as viewed from the rotating direction Dr of the forward driven bevel gear 16, at an angle θ with respect to an imaginary plane 61 normal to a radial plane of the forward driven bevel gear 16. Conversely, the front surface 22h of each recess 22d of the clutch dog member 22 tilts backwards, as viewed from the rotating direction Dr of the forward driven bevel gear 16, at the angle θ with respect to an imaginary plane 62 normal to a radial plane of the clutch dog member 22. Since the forward tilt angle θ of the front surfaces 16d of the teeth 16a is equal to the backward tilt angle θ of the front surfaces 22h of the recesses 22d, the front surfaces 16d of the teeth 16a and the front surfaces 22h of the recesses 22d are able to contact face to face with each other.

The teeth 17a (FIG. 2) of the reverse driven bevel gear 17 have the same configuration as the configuration of the teeth 16a of the forward driven bevel gear 16 just described above, and a further description of the teeth 17a can be omitted. Similarly, the recesses 22e (FIG. 2) of the clutch dog member 22 that are engageable with the teeth 17a of the reverse driven bevel gear 17 have the same configuration as the configuration of the recesses 22d of the clutch dog member 22, and a further description of the recesses 22e can be omitted.

Figure 4:
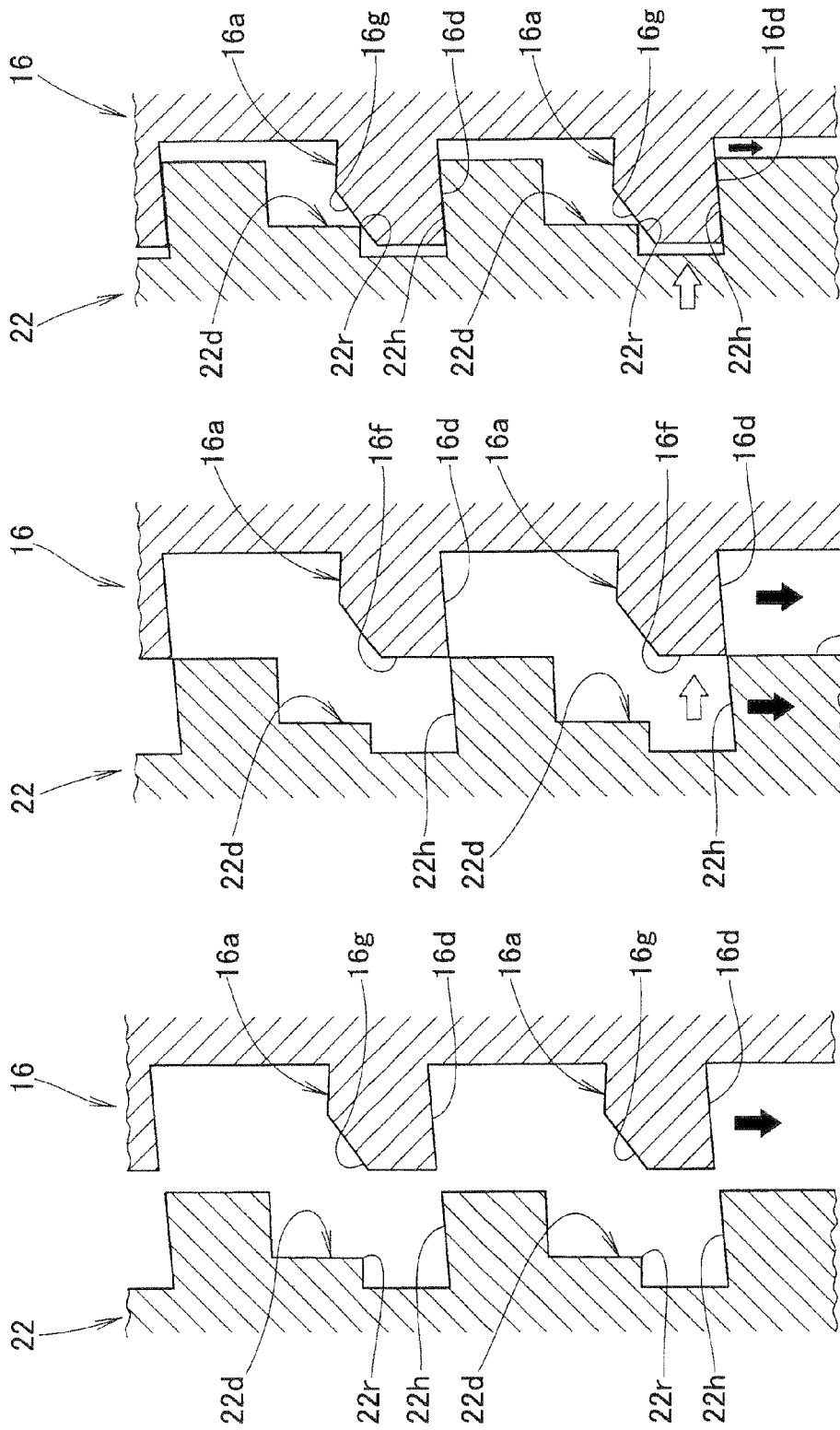

The operation of the dog clutch mechanism of the foregoing construction will be described below in conjunction with the meshing between the clutch dog member 22 and the forward driven bevel gear 16. Operation begins with parts in a condition shown in FIG. 4A wherein the forward driven bevel gear 16 is rotating in the direction of a thick solid arrow, while the clutch dog member 22 is either at a stop in a neutral position, or rotating in the same direction as the forward driven bevel gear 16 at a speed lower than the rotating speed of the forward driven bevel gear 16.

The clutch dog member 22 is then displaced in an axial direction toward the forward driven bevel gear 16, as indicated by a profiled arrow shown in FIG. 4B. By thus displacing the clutch dog member 22, the end surface 22g of the clutch dog member 22 comes into friction contact with the top surfaces 16f of the teeth 16a of the forward driven bevel gear 16 and, subsequently, the front surfaces 22h of the recesses 22d of the clutch dog member 22 are caught or engaged by the front surfaces 16d of the teeth 16a of the forward driven bevel gear 16 whereupon the forward driven bevel gear 16 rotates the clutch dog member 22 together with the propeller shaft 21

(FIG. 2) at the same speed as the forward driven bevel gear 16, as indicated by the thick solid arrow shown in FIG. 4C.

Continued axial movement of the clutch dog member 22 toward the forward driven bevel gear 16 brings the recesses 22d of the clutch dog member 22 into complete meshing with the teeth 16a of the forward driven bevel gear 16, 25 as shown in FIG. 4C. In this condition, the front surfaces 16d of the teeth 16a of the forward driven bevel gear 16 and the front surfaces 22h of the recesses 22d of the clutch dog member 22 are in face to face contact with each other, and the beveled surfaces 16g of the teeth 16a of the forward driven bevel gear 16 are in contact with the corner edges 22r of the recesses 22d of the clutch dog member 22, so that there is zero clearance and motive power is transmitted from the front surface 16d of the teeth 16a of the forward driven bevel gear 16 to the front surfaces 22h of the 5 recesses 22d of the clutch dog member 22.

In this instance, a clearance in the axial direction and a clearance in the rotating direction between the beveled surfaces of teeth 16a of the forward driven bevel gear 16 and the corner edges of recesses 22d of the clutch dog member 22 are zero and, hence, the forward driven bevel gear 16a and the clutch dog member 22 rotate in unison 10 with each other.

In this instance, if rotation fluctuation occurs at an engine crankshaft (not shown) due to irregular combustion of the engine and the rotation fluctuation is transmitted to the forward driven bevel gear 16, a striking noise does not take place because there is no clearance formed between the beveled surfaces of teeth 16a 15 of the forward driven bevel gear 16 and the corner edges of recesses 22d of the clutch dog member 22 as viewed from the rotating direction of the forward driven gear 16. Thus, the dog clutch mechanism can operate silently without generating unpleasant striking noise.

Figure 5:
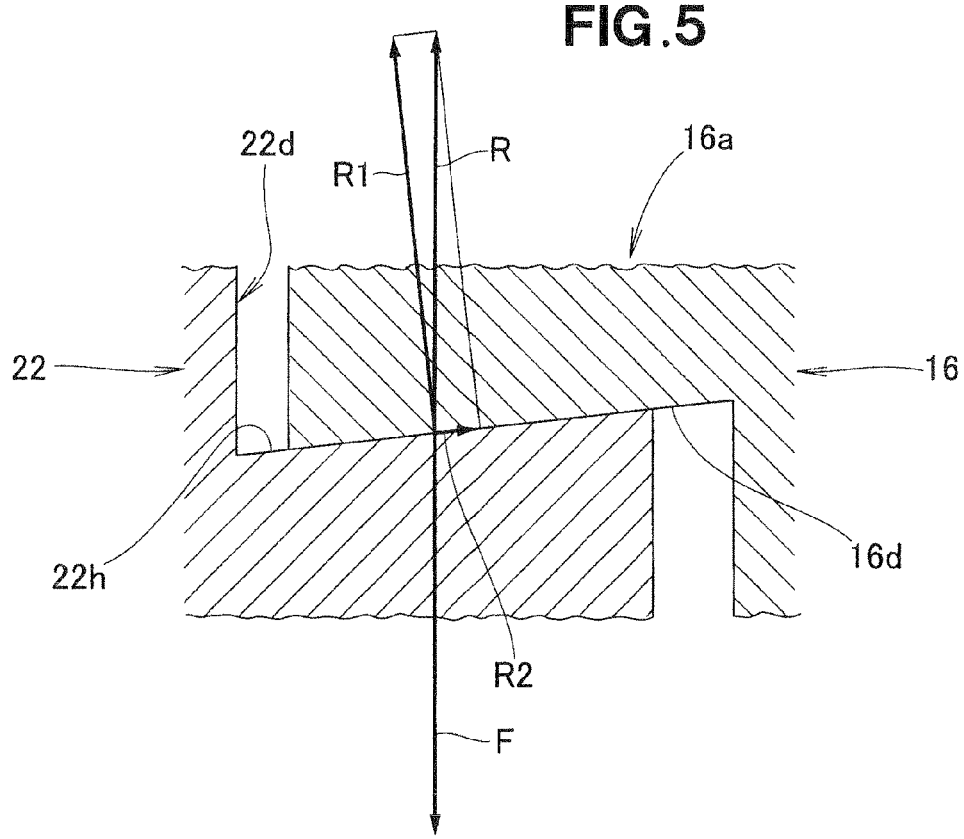
FIG. 5 is an enlarged view of a portion of FIG. 4C, illustrative of an operation of the clutch dog member.

As shown in FIG. 5, when the front surface 16d of each tooth 16a of the forward driven bevel gear 16 comes in contact with the front surface 22h of a mating one of the recesses 22d of the clutch dog member 22, the front surface 22f of the recess 22d is forced by the front surface 16d of the tooth 16a at a force F and, at the same time, a reaction force R acts on the front surface 22d of the mating tooth 16a. The reaction force R is the same in magnitude as the force F and opposite in direction to the force F.

Since the front surface 16d of the tooth 16a tilts forwardly at a predetermined angle as viewed from the rotating direction of the forward driven bevel gear 16, and since the front surface 22h of the mating recess 22e tilts backwards, as viewed from the rotating direction of the forward driven bevel gear 16, at the same angle as the front surface 16d of the tooth 16a, the reaction force R has a first component force R1 acting in a direction perpendicular to the front surface 16d of the tooth 16a, and a second component force R2 acting in a direction from the top to the bottom of the tooth 16a along the front surface 16d of the tooth 16a. By the action of the second component force R2 of the reaction force R, the dog clutch member 22 is pulled toward the forward driven bevel gear 16 so that the front surface 22h of the recess 22d is kept forced against the front surface 16d of the tooth 16a.

The second component force R2 of the reaction force R acts to keep the corner edge 22r (FIG. 4C) of each recess 22d of the clutch dog member 22 into contact with the beveled surface 16g of a mating one of the teeth 16a of the forward driven bevel gear 16. Thus, there is no clearance produced between the recesses 22d of the clutch dog member 22 and the teeth 16a of the forward driven bevel gear 16 as viewed from the rotating direction of the forward driven bevel gear 16 while the clutch dog member 22 and the forward driven bevel gear 16 are rotating in an engaged state.

Figure 6A:
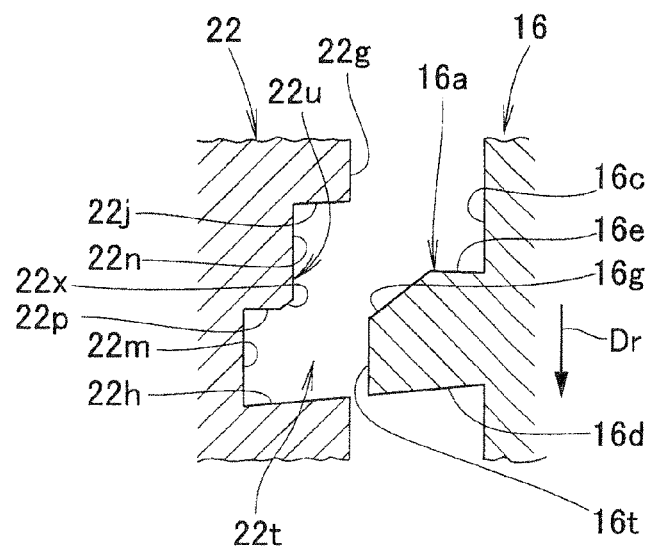
FIGS. 6A and 6B are view corresponding to FIGS. 4A and 4C, respectively, but showing a modified form of the recesses of the clutch dog member according to the invention.
Figure 6B:
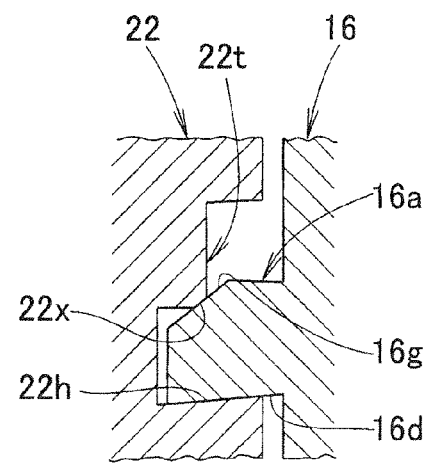

FIGS. 6A and 6B show a modified form of the dog clutch mechanism according to the present invention. The modified dog clutch mechanism differs from the dog clutch mechanism described above with reference to FIGS. 1 through 5 only in the structure of the recesses of the clutch dog member 22. Due to the structural similarity, these parts which are identical to those shown in FIGS. 1 through 5 are designated by the same reference characters and a further description thereof can be omitted.

FIGS. 6A and 6B show in cross section one of teeth 16a of the forward driven bevel gear 16 and a mating one of recesses 22t of the clutch dog member 22 that are developed in a circumferential direction of the forward driven bevel gear 16. As shown in FIG. 6A, the recesses 22t of the clutch dog member 22 are cut into a base surface (end face) 22g of the clutch dog member 22. Each of the recesses 22d has opposing inner surfaces 22h and 22j and a bottom surface 22u extending between the inner surfaces 22h and 22j. The inner surface 22h is located forwardly of the inner surface 22j as viewed from the rotating direction Dr of the forward driven bevel gear 16. For purposes of illustration, the inner surface 22h and the inner surface 22j will be hereinafter referred to as "front surface" and "rear surface", respectively.

The bottom surface 22u of the recess 22t is stepped to provide a corner edge 22x formed at a stepped portion thereof. The stepped bottom surface 22u has a lower section 22m located adjacent to the front surface 22h, and a higher section 22n located adjacent to the rear surface 22j and connected to the lower section 22m by a boundary surface 22p extending perpendicularly to the lower and upper sections 22m and 22n. With the bottom surface 22u thus stepped, the recess 22t is deeper at the lower bottom surface section 22m than at the higher bottom surface section 22n. The corner edge 22x is a beveled corner edge, which is beveled at the same angle as the beveled angle of the beveled surface 16g of the tooth 16a of the forward drive bevel gear 16.

The teeth 16a and the recesses 22t are configured such that when the clutch dog member 22 and the forward driven bevel gear 16 engage with each other with the front surfaces 22h of the respective recesses 22t held in abutment with the front surfaces 16d of the mating ones of the teeth 16a, the beveled corner edges 22x of the stepped bottom surfaces 22u of the recesses 22t are in contact with the beveled surfaces 16g of the teeth 16a, as shown in FIG. 6B. With this engagement, motive power is transmitted from the front surfaces 16d of the teeth 16a of the forward driven bevel gear 16 to the front surfaces 22h of the recesses 22t of the clutch dog member 22.

Since the stepped bottom surface 22u of each recess 22t has a beveled corner edge 22x, it is possible to reduce a surface pressure acting between the beveled corner edge 22x and the beveled surface 16g of a mating one of the teeth 16a when they are engaged together and also possible to reduce abrasive wear of the beveled corner edge 22x and the beveled surface 16g of the tooth 16a.

As thus far described, the dog clutch mechanism provided according to the present invention for transmitting power from a driving source (drive shaft 13) to a propeller shaft 21 of an outboard motor includes a forward gear 16 and a reverse gear 17 that are rotatably mounted on the propeller shaft 21 in opposed relation to one another and driven by the driving shaft 13 to rotate concurrently in opposite directions relative to each other. A hollow cylindrical clutch dog member 22 is slidably disposed on the propeller shaft 21 between the forward and reverse gears 16, 17 and is rotatable with the propeller shaft. The forward and reverse gears 16, 17 each have a plurality of teeth 16a, 17a on a surface 16c that opposes the clutch dog member 22. Each of the teeth 16a, 17a has a beveled surface 16g at a rear side edge thereof as viewed from a rotating direction of each gear 16a, 17a. The clutch dog member has a plurality of recesses 22d, 22e on each end surface 22g thereof that opposes the forward or reverse gear 16, 17. The recesses 22d, 22e are receptive of respective ones of the teeth 16a, 17a of each of the forward and reverse gears 16, 17 when the clutch dog member 22 engages with the forward or reverse gear 16, 17. Each of the recesses 22d, 22e has a bottom surface 22m stepped to provide a corner edge 22r at a stepped portion thereof. The corner edge 22r is configured such that the corner edge 22r is in contact with the beveled surface 16g when the recesses 22d, 22e of the clutch dog member 22 engage with the teeth 16a, 17a of the forward or reverse gear 16, 17.

Since the corner edge 22r of each recess 22d, 22e of the clutch dog member 22 is in contact with the beveled surface 16g of a mating one of the teeth 16a of the forward or reverse gear 16, 17 when the recesses 22d, 22e of the clutch dog member 22 engage with the teeth 16a, 17a of the forward or reverse gear 16, 17, there is no clearance formed between the recesses 22d, 22e of the clutch dog member 22 and the teeth 16a, 17a of the forward or reverse gear 16, 17 as viewed from the rotating direction of the gear. In the absence of the clearance in the rotating direction, the dog clutch mechanism can operate silently without generating unpleasant striking noise even when the recesses 22d, 22e and the teeth 16a, 17a are subjected to torsional vibrations produced when the engine undergoes irregular combustion.

The beveled surfaces 16g of the teeth 16a, 17a of the forward or reverse gear 16, 17 which are used in combination with the corner edges 22r of the recesses 22d, 22e of the clutch dog member 22 allow for the use of large dimensional tolerances for the recesses 22d, 22e and the teeth 16a, 17a, which will lead to cost reduction of the dog clutch mechanism. The corner edges 22r of the recesses 22d, 22e may be formed into beveled corner edges 22x (FIGS. 6A and 6B) in which instance the beveled corner edges 22x reduce a surface pressure between themselves and the beveled surfaces 16g of the teeth 16a, 17a and thus reduce abrasive wear of the stepped bottom surfaces 22u of the recesses 22t and the beveled surfaces 16g of the teeth 16a, 17a.

Obviously, various minor changes and modifications of the present invention are possible in light of the above teaching. It is therefore to be understood that within the scope of the appended claims the invention may be practiced otherwise than as specifically described.

What is claimed is:

1. A dog clutch mechanism for transmitting power from a driving source to a propeller shaft of an outboard motor, comprising:
   a forward gear and a reverse gear that are rotatably mounted on the propeller shaft in opposed relation to one another and driven by the driving source to rotate concurrently in opposite directions relative to each other;
   a hollow cylindrical clutch dog member slidably disposed on the propeller shaft between the forward and reverse gears, the clutch dog member being rotatable with the propeller shaft;
   the forward and reverse gears each having a plurality of teeth on a surface that opposes the clutch dog member, each of the teeth having a planar beveled surface at a rear side edge thereof as viewed from a rotating direction of each gear, the planar beveled surface being configured between a rear surface and a top surface of each of the teeth, and a front surface facing in a forward direction as viewed from a rotating direction of an associated one of the forward and reverse gears;
   the clutch dog member having a plurality of recesses on each end surface thereof that opposes the forward or reverse gear, the recesses being receptive of respective ones of the teeth of each of the forward and reverse gears when the clutch dog member engages with the forward or reverse gear and the recesses having a front surface in face to face engagement with the front surface of each of the teeth; and
   each of the recesses having a bottom surface stepped with two flat surfaces having a corner edge at a stepped portion therebetween, wherein the corner edge is a sharp corner edge, and wherein a first of the two flat surfaces of each recess is at a first depth and a second of the two flat surfaces is at a second depth lower than the first depth, the second flat surface being located adjacent to the front surface of each recess; and
   wherein when the recesses of the clutch dog member are in meshing engagement with the teeth of the forward or reverse gear with the front surfaces of the respective recesses being in face to face contact with the front surfaces of the respective teeth, the corner edge of the stepped portion of the bottom surface of each recess is in direct contact with the beveled surface of a corresponding one of the teeth so that the clutch dog member and the forward or reverse gear are immovable relative to each other in a circumferential direction even when the clutch dog member and the forward or reverse gear are subjected to torsional vibrations produced when the driving source undergoes an irregular rotation.

2. The dog clutch mechanism of claim 1, wherein the front surface of each tooth tilts forwardly at a predetermined angle with respect to an imaginary plane normal to a radial plane of the associated gear, and wherein, the front surface of each recess tilts backwards, as viewed from the rotating direction of the forward or reverse gears, at the same angle as the predetermined angle with respect to the imaginary plane perpendicular to the radial plane of the clutch dog member.

* * * * *